United States Patent [19]
Zanin et al.

[11] Patent Number: 5,813,318
[45] Date of Patent: Sep. 29, 1998

[54] INDIVIDUAL UNIT FOR PREPARING AND SERVING COFFEE FOR "ESPRESSO" TYPE COFFEEMAKER

[75] Inventors: Yvano Zanin, Duppigheim; Jean-Paul Farrugia, Scharrachbergheim, both of France

[73] Assignee: Reneka International Zone Industrielle, Duttlenheim, France

[21] Appl. No.: 772,318

[22] Filed: Dec. 20, 1996

[30]   Foreign Application Priority Data

Dec. 21, 1995  [FR]  France .................................. 95 15774
Dec. 21, 1995  [FR]  France .................................. 95 15773

[51] Int. Cl.⁶ ..................................................... A47J 31/24
[52] U.S. Cl. .................. 99/291; 99/293; 99/307
[58] Field of Search .................. 99/291, 293, 302 R, 99/307

[56]   References Cited

U.S. PATENT DOCUMENTS 5,259,297  11/1993  Giuliano .............................. 99/291 X

FOREIGN PATENT DOCUMENTS 1060178  3/1954  France ..................................... 99/291

*Primary Examiner*—Reginald L. Alexander
*Attorney, Agent, or Firm*—Davis and Bujold

[57]   ABSTRACT

The coffee preparation unit comprises a simplified injection group consisting of an assemblage of plastic elements attached to the lower plate (12) of its front portion (11). This group consists of a crosspiece (70) covered by an injection element (60) on an upper distribution chamber (63), which is traversed by a plurality of longitudinal channels communicating with a spray (51) which is attached to the front portion of the injection piece (60). The container holder (55) is attached directly to the lower plate (12) of the front portion (11). The coffee preparation unit also comprises an individual heater (46) for each coffee preparation post, with a flexible tube serving as a hydraulic inlet (47). The invention is of interest to manufacturers of professional "espresso" coffee machines.

20 Claims, 9 Drawing Sheets

INDIVIDUAL UNIT FOR PREPARING AND SERVING COFFEE FOR "ESPRESSO" TYPE COFFEEMAKER

REALM OF THE INVENTION

This invention relates to an individual unit for preparing and serving coffee for an "espresso" type coffeemaker, comprising an injection group with a simplified structure associated with an individual heating unit for the preparation station, making the preparation location functionally independent

BACKGROUND OF THE INVENTION

A complete, multi-unit coffeemaker for preparing "espresso" type coffee is formed by juxtaposing a plurality of preparation units or posts.

Multi-unit coffeemakers, which are the subject of the invention, generally comprise a single heating unit common to the various coffee preparation posts and also for the production of hot water or steam for other purposes, which are delivered separately by a plunger.

The heated hot water passes indirectly through the common heating unit and supplies an individual preparation circuit, with an electrovalve control, followed by a coffee injection unit formed of a mechanical block through which the hot water passes and which supports the container holder.

The mechanical injection block has a central projection which extends downward. This projection forms the area for delivering the coffee into the cup, and also has a seal and a diffusion element called a spray attachment. The projection is formed in the central portion of the mechanical injection block and then machine-finished.

In addition to the expensive material forming the support and its mechanical complexity, which make the unit costly, this system has other disadvantages relating to maintaining the ideal temperature for coffee preparation:

Because of the inertia of the metal mass surrounding the interior canal through which the water passes before injection, regulation is difficult during intense usage, that is, continuous, high-speed use. After a certain amount of coffee has been prepared, the coffee becomes burning hot.

Conversely, when coffee is prepared at the beginning of a heating cycle, the unit is slow to reach the optimal coffee preparation conditions that prevail during steady usage.

Some manufacturers have solved this problem by adding thermal insulation to the massive connecting pieces between the heating unit and each injection group, or by making these pieces hollow so the water circulating from the heating unit circulates through them.

Unfortunately, both of these modifications have added only slight improvement.

In practice, the hot water transmits calories to the pieces connecting the heating unit and the injection group which, having been heated to a certain temperature by an even greater flow of water, remain at a temperature close to the water temperature as they are continuously heated by the frequent passage of the water. Thus, the water becomes too hot when it exits, since its temperature leaving the heating unit is regulated on the basis of intermittent use, taking into account loss of calories as it passes from the heating unit to the corresponding injection group.

Thus, this hot water transfer system does not ensure the production of high quality coffee under varying conditions.

OBJECTS OF THE INVENTION

To overcome this disadvantage, some devices have provided means for lowering, limiting and regulating the temperature of the water supply to the coffee injection group by using a cold water mixing device placed on the conduit supplying cold water from the cartridge to each injection post.

While this prior art solution constitutes an interesting compromise for coffeemakers constructed in this way, the present invention also provides a way to overcome temperature variations, but in a more complete manner which encompasses the entire hot water circuit, allowing rapid preparation of individual servings of hot water, without either significant inertia or loss of efficiency, within each circuit and each group.

The present invention also solves the problem of regulating water temperature and overcomes cost concerns, as it provides not only a simple, economical and easily assembled injection group, but also a means which considerably simplifies independent production and regulation of hot water using a low cost, small capacity individual heating unit which heats instantly.

SUMMARY OF THE INVENTION

For this purpose, the invention provides a complete, autonomous individual unit for preparing "espresso" type coffee, comprising an individual heating unit and a lightweight injection group.

The unit is characterized by comprising a simplified coffee injection group supplied with hot water by an individual heating unit hydraulically connected to the corresponding injection group by a flexible hydraulic connector through an electrovalve control, and in that the simplified injection group is comprised of a succession of assembled elements forming an interior chamber, which are attached directly to the lower plate of the front portion of the machine, said flexible connector terminating in a branch supplying the injection group through the lower plate, with a succession of elements comprising a cup support attached to said plate, and ending in a spray, replacing the central supporting projection of traditional injection blocks.

The advantages of the present invention surpass the sum of the general advantages of each of the features constituting the invention.

The simplified form and assembly of the unit reduces its cost. The individual circuits and separate heating units for instant production of hot water, together with the flexible, thermally insulated hydraulic connectors, maintain the ideal temperature for preparing numerous servings of coffee in succession.

The lightweight structure of the injection group ensures that the ideal water temperature for coffee preparation can be easily maintained.

BRIEF DESCRIPTION OF THE DRAWINGS

Other characteristics and advantages of the invention will be apparent from the following description, given by way of a non-limiting example, and accompanied by the attached drawings, wherein.

DETAILED DESCRIPTION OF THE VARIATIONS SHOWN

Figure 1:
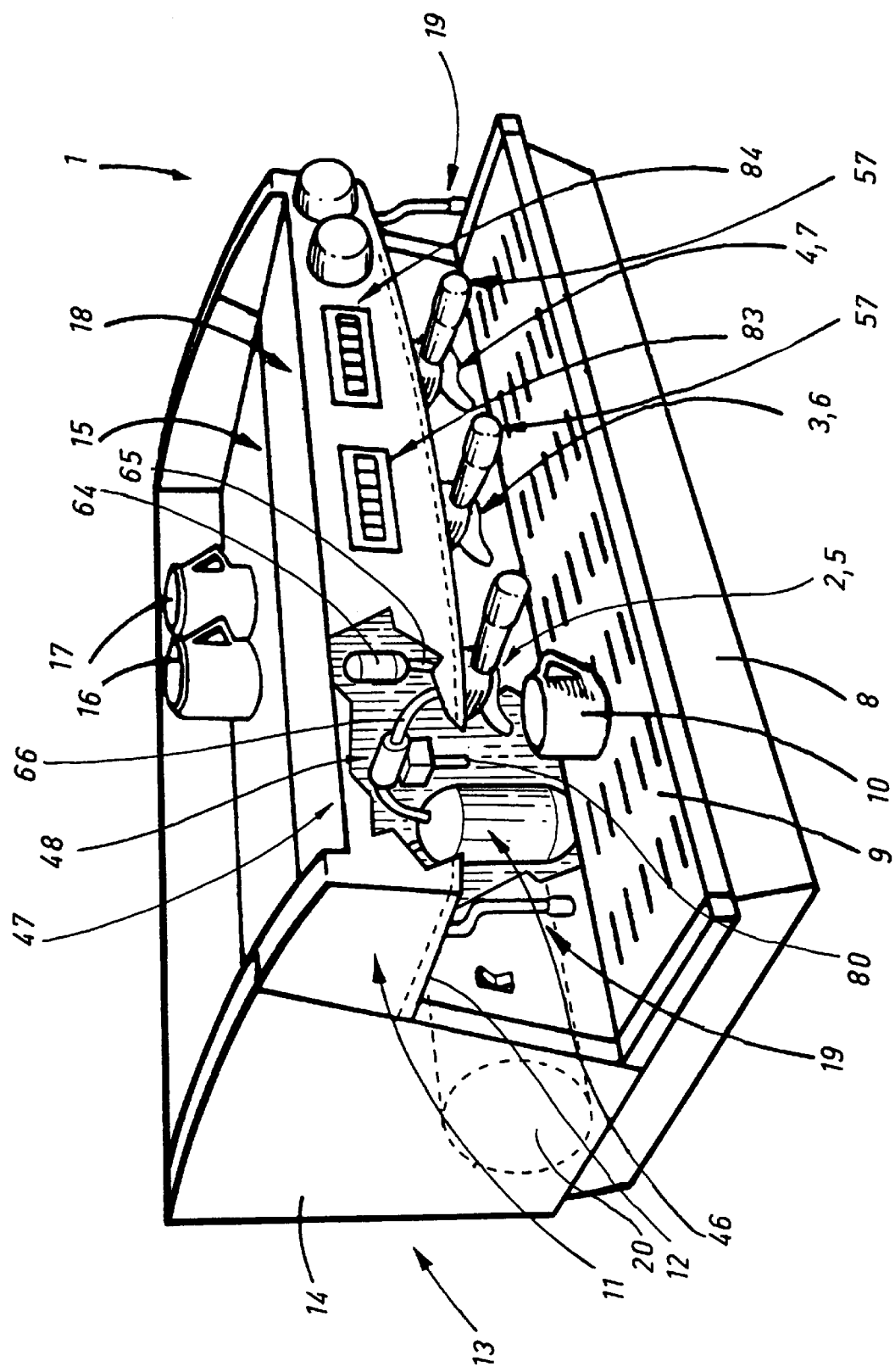
FIG. 1 is a perspective overview showing the "espresso" coffeemaker, partially in cross-section, showing an individual heating unit and the circuit associated with it.

The present invention is useful for a machine 1 for brewing "espresso" type coffee consisting of several coffee preparation posts, for example 2, 3, 4, with corresponding injection groups 5, 6, 7 as shown in FIG. 1.

This type of machine has a body 8 with a lower support plate 9 for holding cups such as cups 10 placed beneath the injection groups, a front portion 11 with a lower base plate 12 traversed by the blocks of the injection groups, each supporting a coffee brewing unit.

The machine also comprises a frame 13 surrounded by a case 14 and an upper plate 15 for maintaining the temperature of coffee cups 16, 17 on the upper portion 18, as well as one or two plungers 19 and their controls, which supply hot water and steam for other purposes, for example, preparing infusions or heating milk.

The interior of the machine has a central heating unit 20 for hot water and steam used for other purposes, and a general water supply 21 with a main water supply valve 22, a water softener 23 and an injection pump 24. According to the invention, each central heating unit 20 is connected only to the plunger-spout or spouts 19 through various safety and control devices (FIG. 6) and is used only for this purpose.

It is important to note that the central heating unit 20 is the only heating unit in a conventional coffeemaker. In such a coffeemaker, it is used for preparing both hot water for coffee, and steam and hot water for other purposes.

Figure 2:
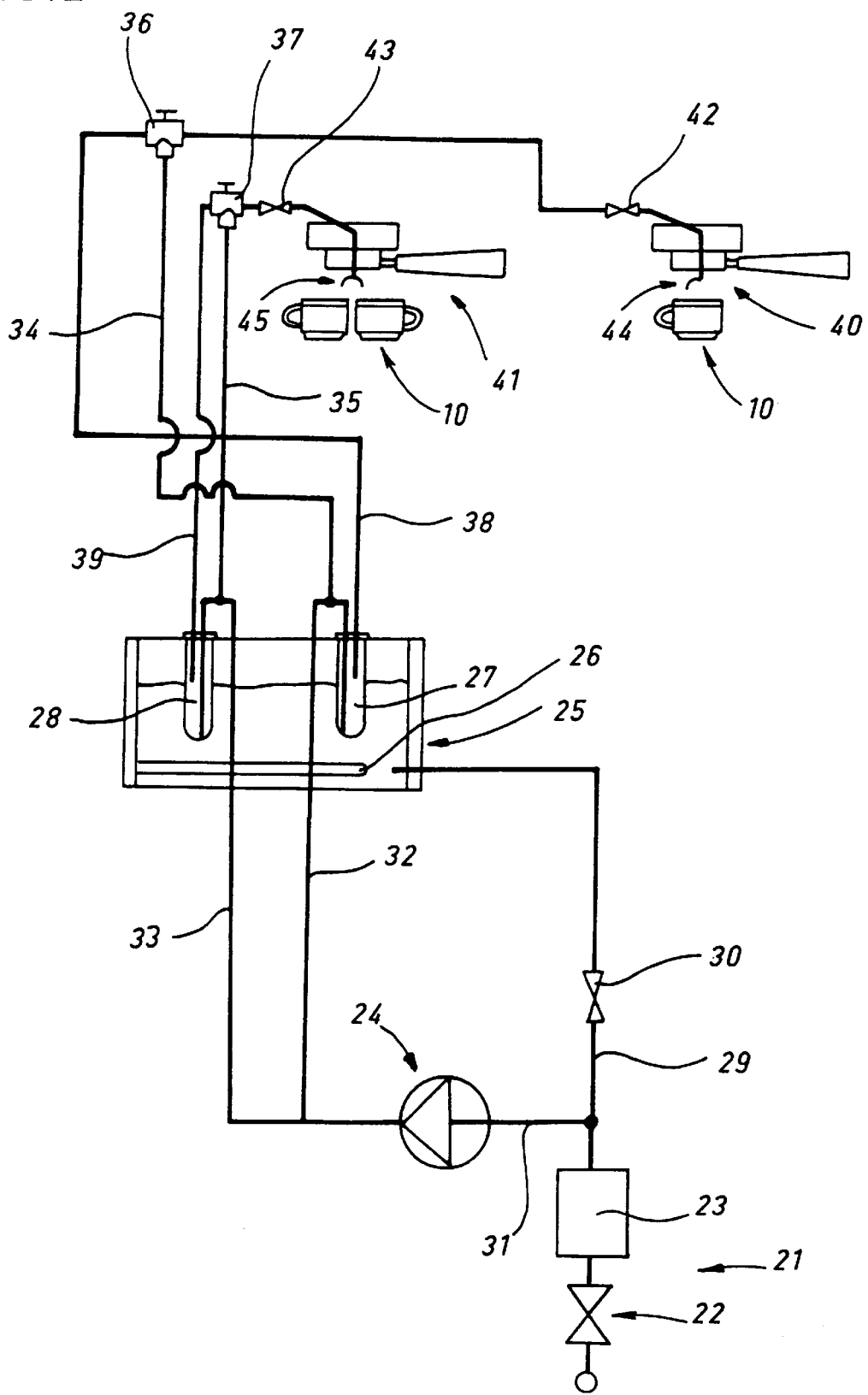
FIG. 2 is a general schema of the water circuits in a conventional coffee maker with two injection groups and a mixer.
Figure 3:
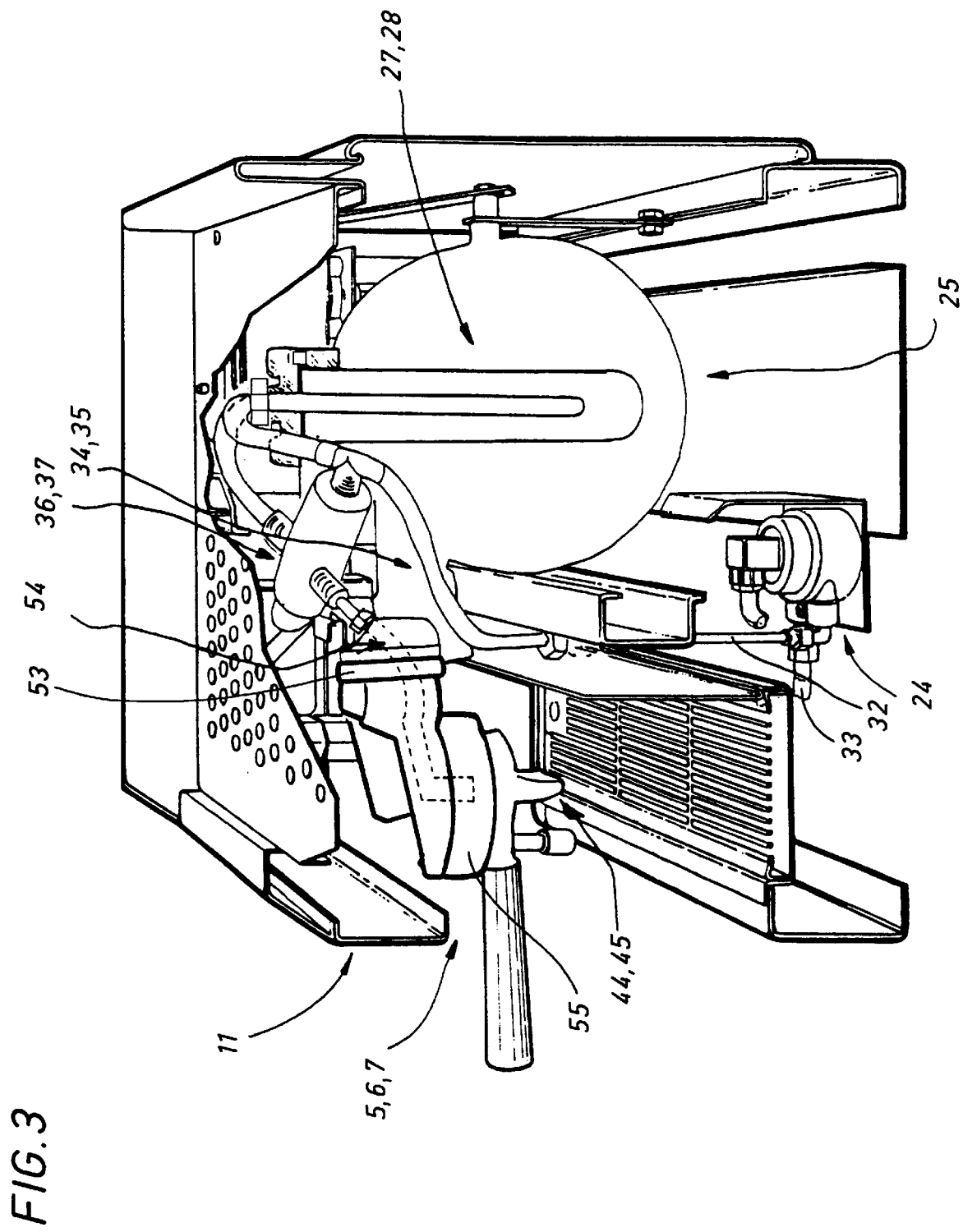
FIG. 3 is a perspective of a portion of a conventional coffeemaker showing the heating unit and its environment, as well as the injection group in the version having a mixer on the hot water preparation circuit.

As is seen in FIG. 2, showing the circuits of a conventional double unit machine, and in FIG. 3, in a conventional system the water is heated in a single heating unit 25 with an immersion heater using the double-boiler principle, with cartridges 27, 28 submerged inside the heating unit, which holds a larger volume of water maintained under pressure at a constant temperature close to the boiling point.

More specifically, water proceeds through the main valve 22 and the water softener 23. The circuit then branches into supply line 29 to the heating unit 25 with an insulating valve 30 and a branch 31 for supplying water for coffee preparation through injection pump 24, and two conduits 32, 33 supplying cold water to the two hermetically sealed heating cartridges 27, 28.

Depending upon the design of the circuit shown, the cold water supply lines 32, 33 each extend into annexed branches 34, 35 as far as the thermostatic mixers 36, 37, the main branch of which receives the water heated by cartridges 27, 28 through hydraulic connectors 38, 39. Water proceeds to the corresponding injection groups 40, 41 through conduits in electrovalve controls 42, 43. Coffee is poured into the cup or cups through a single or double spigot 44, 45.

In a machine constructed of a plurality of functionally independent individual units according to the invention, the single heating unit 25 of prior art machines is replaced by central heating unit 20 designed specifically for the production of hot water or steam for purposes other than "espresso" coffee preparation, for example, tea or milk.

Figure 6:
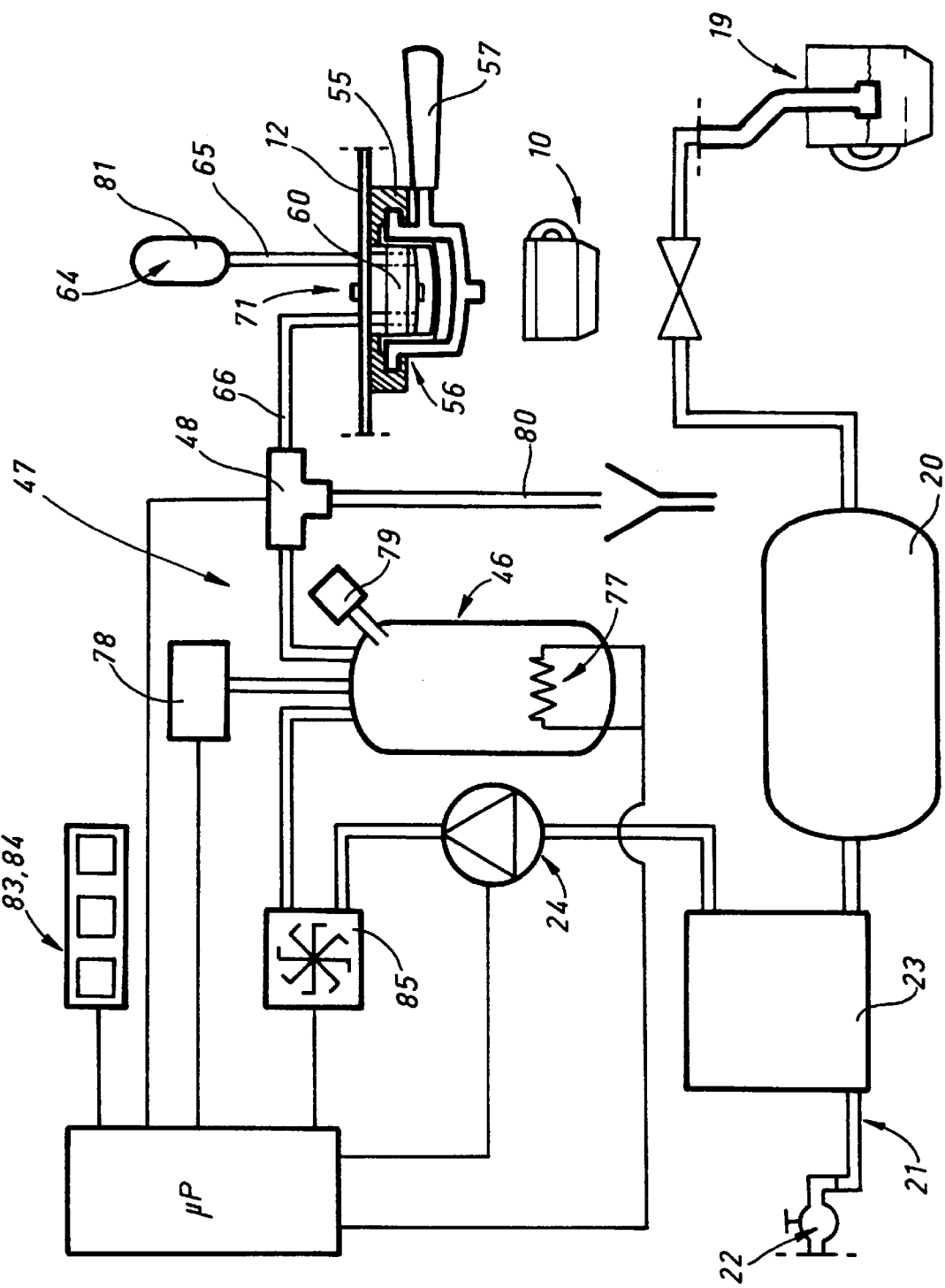
FIG. 6 is a schema illustrating an individual coffee preparation circuit within the machine according to the invention.

A machine constructed in this fashion comprises a plurality of individual heating units such as unit 46 specific to each preparation post 2, 3, 4, each connected to the corresponding injection group 5, 6, 1 by a flexible hydraulic connector such as connector 47, which may be made of flexible material such as thermally insulated plastic, through an electrovalve control 48, as shown particularly in FIG. 6.

Each individual heating unit 46 is associated with an injection group. The heating units are all supplied in parallel through the single injection pump 24. They are of the instant heat type and are economical so they can be thrown away during maintenance or if the individual heating unit malfunctions.

Figure 4:
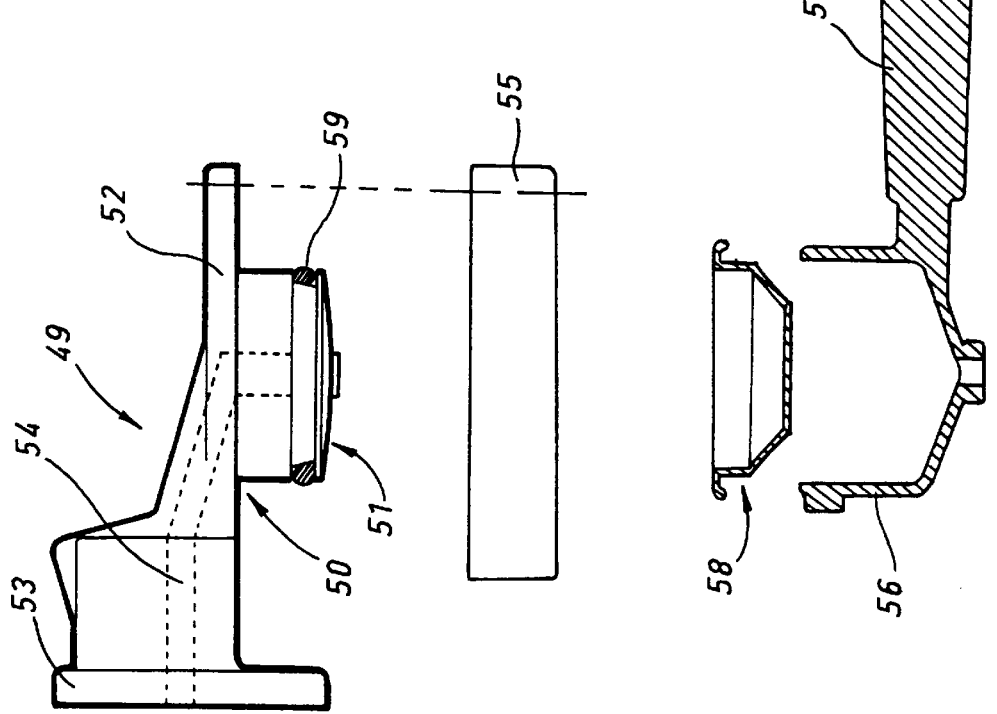

For a better appreciation of the simplicity of the invention, first one of the injection groups of a conventional machine will be examined in detail, with reference to FIG. 4.

A conventional injection group comprises a massive, metal injection block 49 with a plan interior surface having a central projecting interface 50 formed in part of the central portion and then machine-finished. On this projection 50, which serves as both a connecting unit and a mechanical means for packing coffee grounds, is a diffusion unit commonly known as a spray 51.

Injection block 49 is a massive support 52, for example made of brass, connected to the rest of the circuit by a belt 53 and there is an inlet 54 penetrating the support for the passage of hot water to the spray through central interface projection 50.

The lower plan surface of the injection block serves as a support for a female element usually called a cup-holder 55, that is, a screwed-on piece for mounting a container 56 with a handle 57 designed to hold a strainer 58 for the ground coffee which will be brewed by the drip method.

Figure 5:
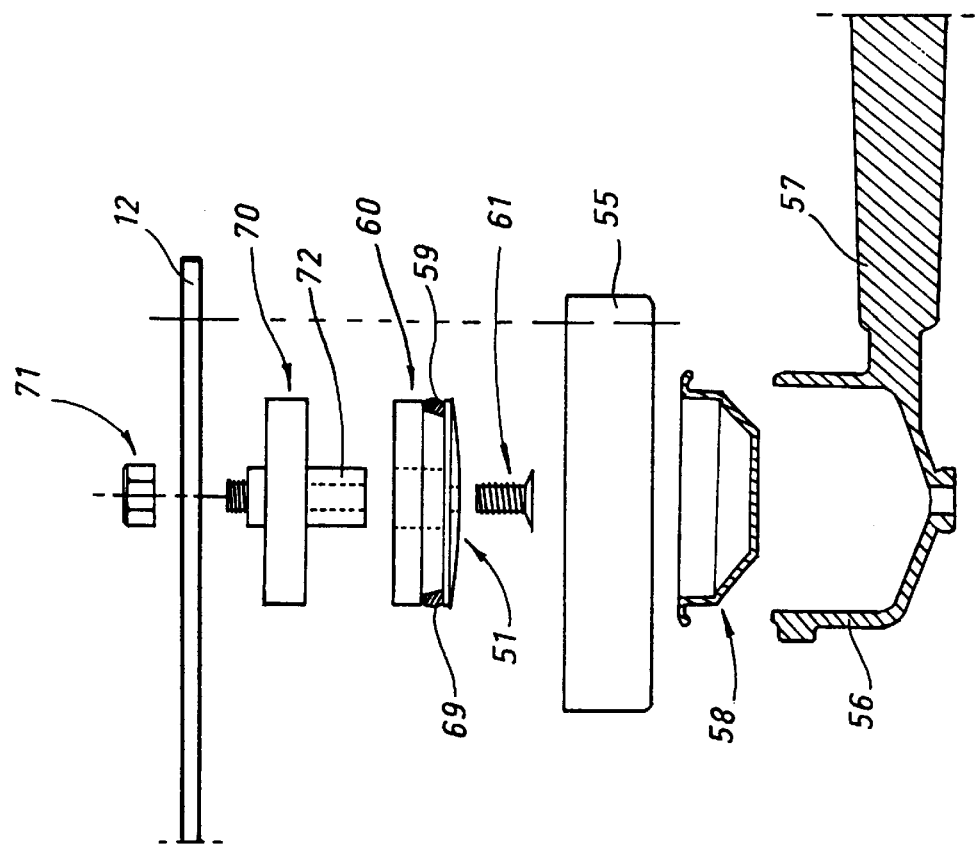
FIGS. 4 and 5 are cross-sections of a disassembled injection group from a conventional machine and from the improved version according to the invention.

Strainer 58, held by container 56, is attached to central projection 50 so the ground coffee can be lightly packed inside. In the conventional version, a seal is formed between projection 50 and strainer 58 using a flat gasket or, in an original but known manner, using a toric gasket 59 as shown in FIGS. 4 and 5.

According to the present invention, the injection group is unique first because it lacks the massive, onerous, metal mechanical support 52 constituting injection block 49 and, as a result, holder 55 can be attached directly to the subsurface of the lower plate 12 of the front portion 11; and also because central projecting interface unit 50 is formed of an assemblage of elements, as will be shown below.

Holder 55, which will be attached to container 56, is solidly attached directly to the lower plate 12 of the subsurface of front portion 11.

It is attached firmly in order to withstand the maneuvers involved in attaching or removing container 56 with its holder 55.

Another feature of the simplified injection group, according to the invention, is the direct connection of the water inlet on the interface and injection unit, and the existence of the hydropneumatic storage hydraulically connected to the interface and injection unit.

Figure 7:
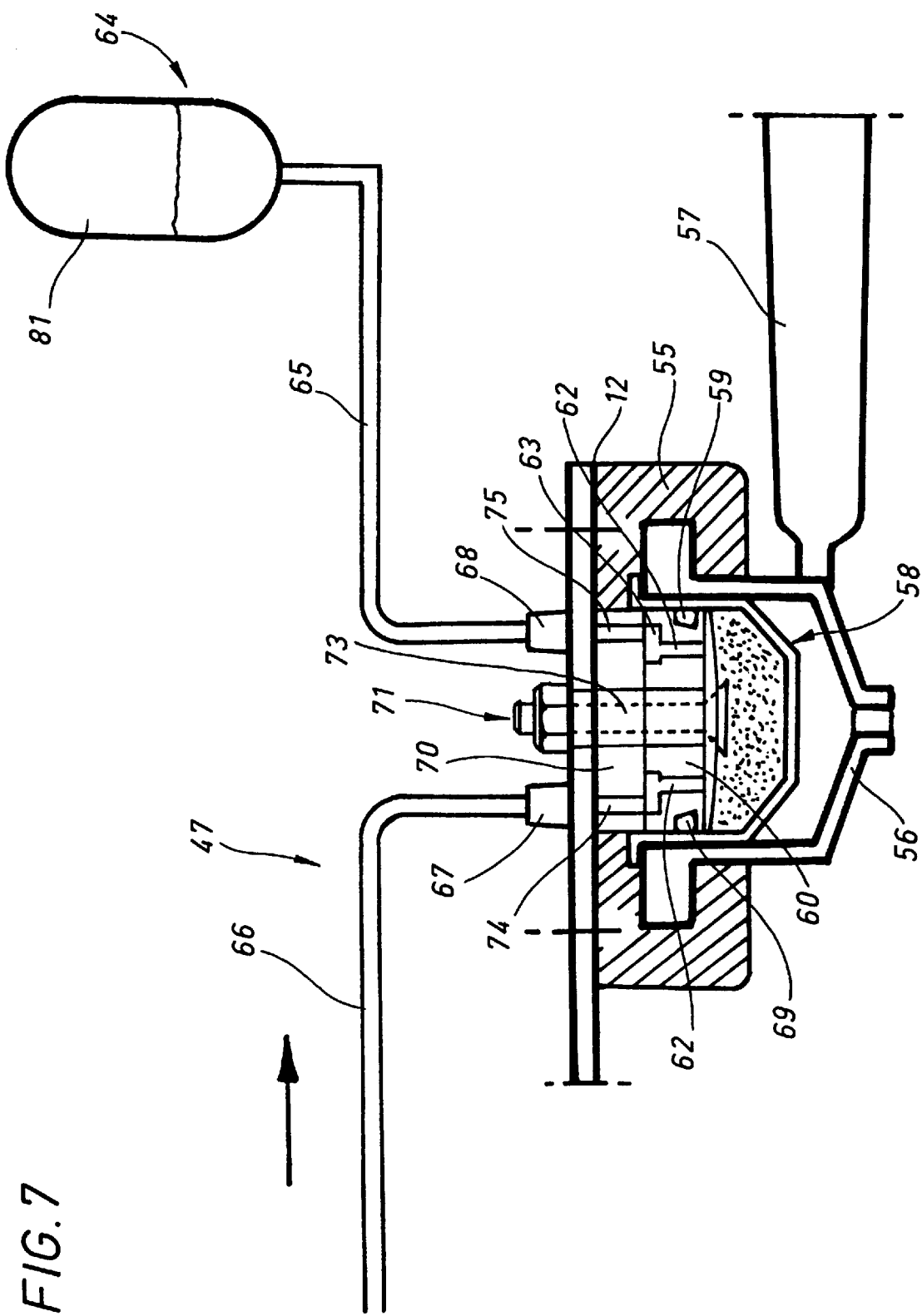
FIG. 7 is a transverse cross-section of the improved injection group.
Figure 8:
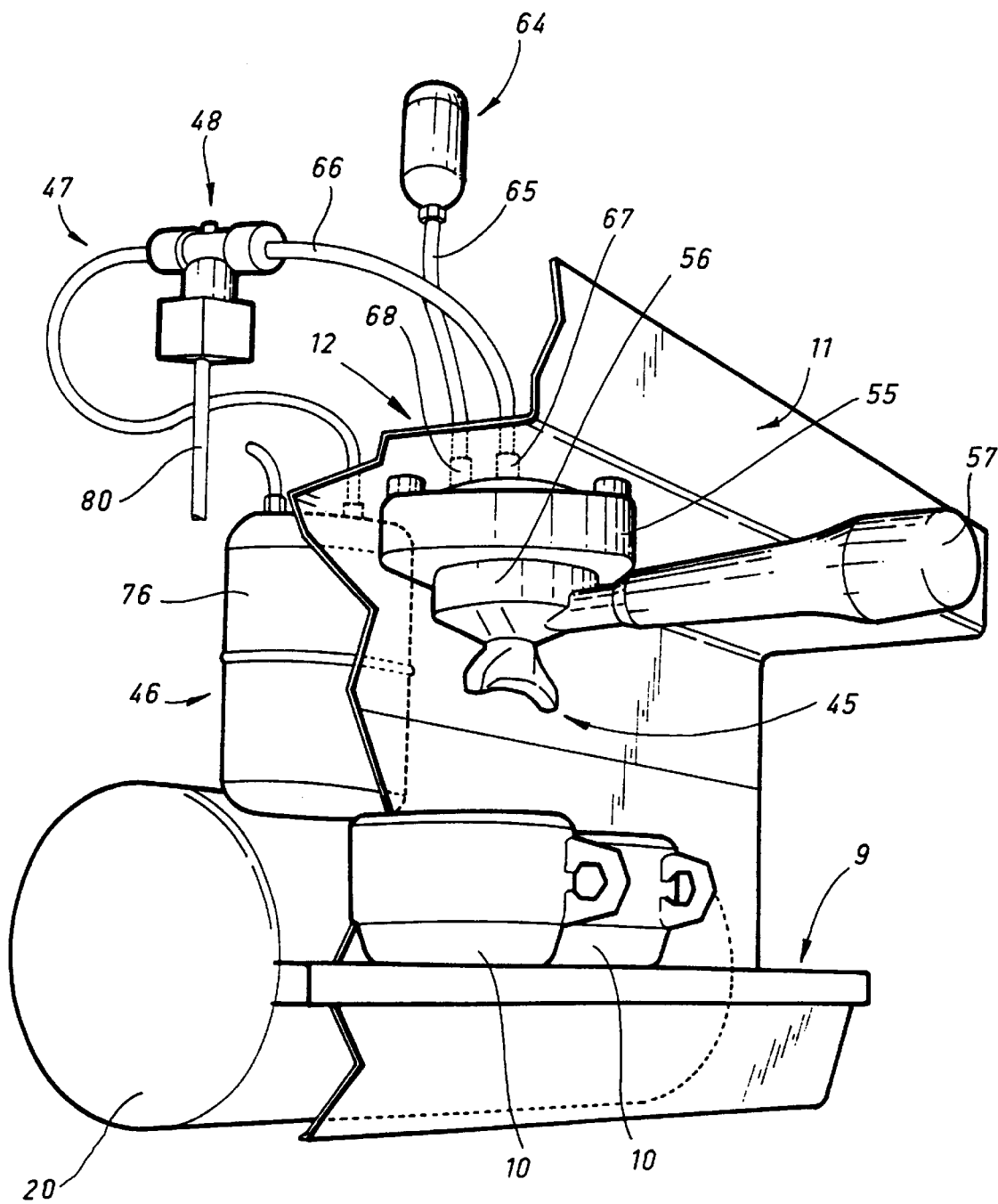
FIG. 8 is a perspective from the front showing the portion of the machine specific to an individual circuit.
Figure 9:
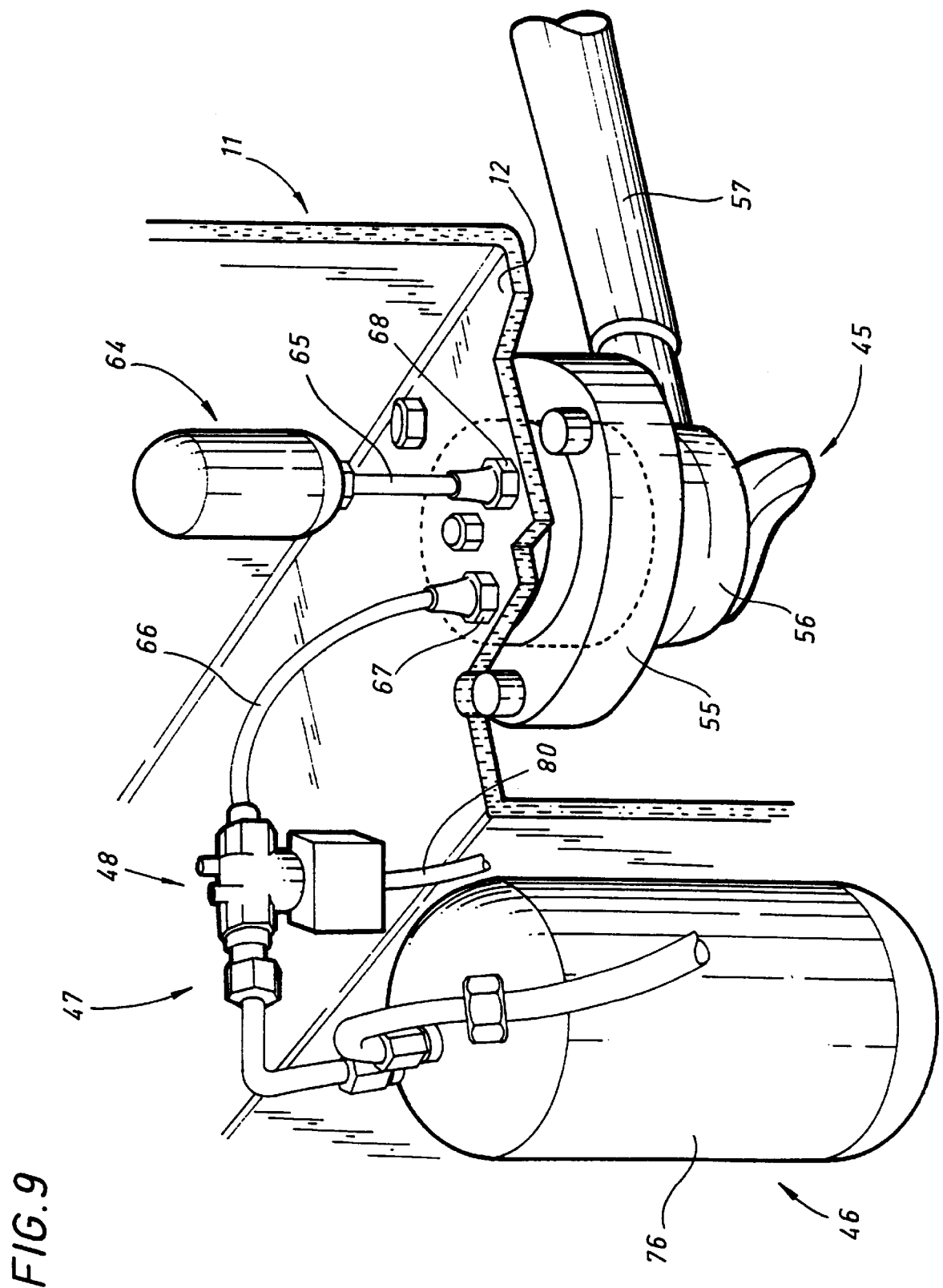
FIG. 9 is a perspective from the rear showing the portion of the machine specific to an individual circuit.

With reference to FIGS. 5 through 7, each injection and interface group in the coffee machine, consisting of several juxtaposed functionally independent units, is composed of individual elements, removable in succession, located between the strainer 58 and the subsurface of lower plate 12 of front portion 11.

First there is an injection piece 60 which transmits hot water to the coffee through the diffuser or spray element 51. The spray element is attached to the front portion, perhaps by a screw 61. A plurality of longitudinal canals 62 open through this front portion for the passage of water through the injection piece, with canals 62 communicating upward with an upper annular distribution chamber 63 supplied with hot water by flexible conduit inlet 47 and hydraulically connected with a hydropneumatic storage 64 through an intermediate piece (FIG. 7).

Hydraulic connections 65 and 66, which exist not only between hydropneumatic storage 64, electrovalve 48 and the next injection group thus formed, but also between electrovalve 48 and that injection group, are also made of flexible tubes, preferably thermally insulating plastic, with the injection ends connected to the interface and injection unit by connectors 67, 68, which may have one threaded portion meshing with the other portion.

This injection element 60 also seals the strainer, perhaps by using a peripheral groove 69 with a toric seal 59 on the lateral surface, as shown in FIGS. 4 and 5.

The interface and injection unit is attached to lower plate 12 using an intermediate piece called the crosspiece 70 which functions as a support and a contact, formed of a disc applied to the lower plate 12 of the subsurface of front portion 11 and attached to this plate by a screw-pin connection 71.

Crosspiece 70 has an interior threaded portion 72 toward the bottom of its central portion, which receives screw 61 attaching spray element 51.

Holder 55 may be attached at three points by other screw-pin connections to the subsurface of lower plate 12 on the subsurface of front portion 11.

Three conduits penetrate the disc forming cross piece 70 from side to side: a first central conduit 73 for a means of attachment to lower plate 12 of the subsurface of front portion 11, a second excentric conduit 74 for injecting hot water, and a final conduit 75 which may be, but is not necessarily, diametrically opposed to the second tube for connection with hydropneumatic storage 64 (FIGS. 5 through 7).

These conduits communicate hydraulically with the annular distribution chamber 63 of the injection piece and then with the spray through distribution channels 62.

In order to furnish hot water at an ideal, constant temperature to the injection region of annular distribution chamber 63 and avoid the problems caused by thermal inertia of the metal masses of the circuits and the injection block, each individual heating unit supplying each coffee injection group has a small volume, for example one liter, and the flexible distribution tubes made of thermally insulated plastic extend as far as the point of injection into the coffee. Likewise, the elements which constitute the injection unit are made of thermally insulated plastic.

The use of such thermally insulated plastic tubes virtually eliminates any change between the temperature of the water leaving the heating unit and its temperature at the injection point.

It is easy to thermally stabilize these elements at the optimal brewing temperature using a heating means, for example a thin electric resistor (not shown), applied or affixed to lower plate 12 in the region where the injection group is attached.

More specifically, the individual heater, known as an instant heat unit, is small in size, being formed of a closed container 76 of reduced volume with a least one heating plunger 77, a regulating sensor 78 associated with the heating unit control, and a safety sensor 79 maintaining the temperature below the dangerous level. Electrovalve 48 has two valves, one of which is a return valve for evacuation through a discharge element 80.

The coffee machine described consists of several juxtaposed individual units, functionally independent, for the preparation of coffee. They can be used separately, without engaging the entire machine and wasting energy. One of the preparation units can also be individually regulated for specialized uses without affecting the other units.

Next, the hydropneumatic storage 64 and its function in the hot water distribution for coffee preparation will be examined.

It consists of a small capacity container 81, preferably metal, in the form of a closed, mini-carboy, tightly connected to the distribution circuit at the level of the annular distribution chamber 63 on injection element 60.

The interior volume of this mini-carboy forming the hydropneumatic storage is free, but closed and watertight, so that it acts as a hydropneumatic shock absorber.

It works in two different ways. Under compression, it absorbs the pressure spurts coming from injection pump 24, since the sealed interior, filled with air, serves as a pneumatic cushion during momentary pressure increases at the beginning of the coffee preparation cycle, which generally consists of a short, initial readying phase, followed by continuous drip-brewing. Since these two phases are separated by a short "down" time, the initial pause in pressure, as well as the subsequent pressure rise, are neutralized by hydropneumatic storage 64.

The hydropneumatic storage 64 also works as a detente, so if injection pump 24 stops and the capacity has been inflated by the pressure of brewing, this energy is restored to the circuit and forces the unused water, or a portion of it, toward the discharge through electrovalve control 48 to be evacuated through discharge outlet 80.

According to another original feature of the invention, each electrovalve control 48 rests on one of the metal elements of the body of the machine, which is used as a heat dissipator. This dissipation prevents the body of the valve from overheating, and thereby contributes to maintaining the water at the ideal coffee preparation temperature.

Figure 10:
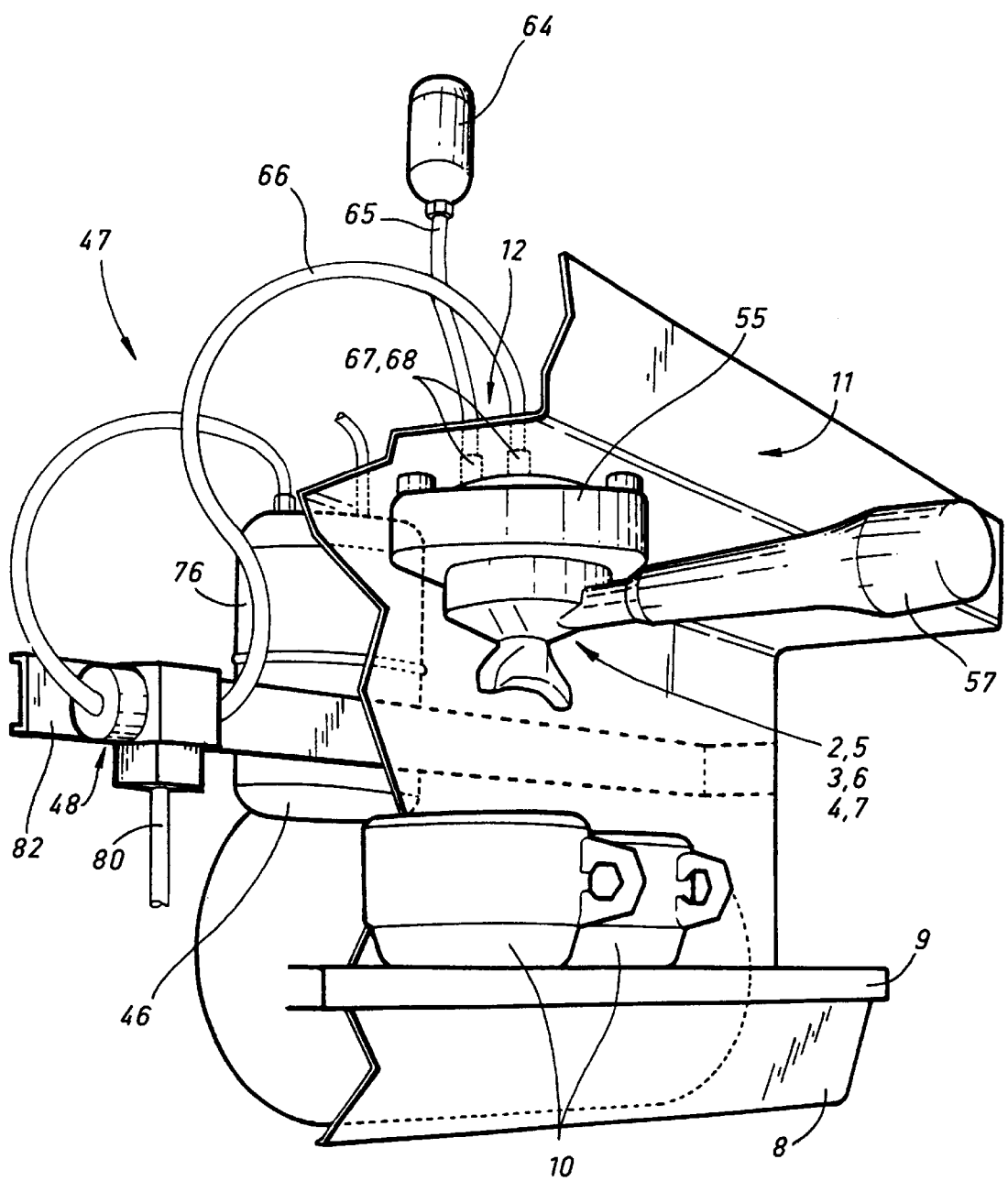
FIG. 10 is a perspective showing the group attached to an exemplary coffee preparation station with an electrovalve attached to one element of the structure.

Electrovalve 48 may be attached to one of the following portions of the body of the machine: the body of the individual heating unit (46) or a cross bar 82 on the front portion of the frame, or a crosspiece or other component of the chassis large enough to provide an adequate thermal dissipation surface, as shown in FIG. 10.

The machine may be purely manual or semi-automatic, with a keypad control such as 83 and 84.

After passing through softener 23, which comprises a supplementary outlet in central heating unit 20, the cold water is admitted into injection pump 24, the outlet of which supplies each individual heater 46 through an individual water meter 85.

All the functions are controlled by a microprocessor LP using an internal program customized for the machine, with the commands received from keypads 83, 84 on the front portion 12 of the machine, and data regarding water quantity supplied in code by the individual water meter 85, taking into account the values of temperature sensor 78 in individual heating unit 46.

The function sequence is as follows:

Microprocessor 1P records the commands and then causes electrovalve 48 to open pump 24 and operate; the flow of water from pump 24 activates water meter 85. The elementary water quantity values are transmitted as impulses to the microprocessor and stored by it. When the amount of water corresponds to the amount selected, the microprocessor stops pump 24 and closes the main valve of the electrovalve between heater 46 and the corresponding injection group, while simultaneously opening the valve leading to the discharge conduit.

The desired amount of hot water passes over the ground coffee, leaving the unit as a liquid extract and filling the cup or cups placed beneath the group.

After the quantity of hot water has been injected into the coffee and the pressure lowered when pump 24 stops, the water remaining in the pneumatic capacity empties by decompression through the terminal branch of the circuit, and is then evacuated through the electrovalve control 48 and discharge outlet 80.

Discharging the water in this way, through conduit 65 of hydropneumatic storage 64, ensures that all residual water is evacuated and eliminates the possibility of it being mixed with the hot water for a new batch.

We claim:

1. An individual coffee preparation unit for the preparation and distribution of coffee for an espresso coffeemaker, the individual coffee preparation unit comprising:

a body (8) having a lower support plate (9) for supporting at least one cup and a front portion (11) of the individual coffee preparation unit having a lower base plate (12), spaced from the lower support plate (9), supporting a plurality of coffee preparation units (2, 3, 4), each one of the plurality of coffee preparation units (2, 3, 4) having a coffee injection group (40, 41) connected to a supply of electrically heated water for receiving water and preparing coffee;

wherein each one of the injection groups (40, 41) is connected to an individual heating unit (46) via a first flexible hydraulic connector (47), an electrovalve (48) is provided in the flexible hydraulic connector (47) to control a flow of heated water therethrough, and each one of the injection groups (40, 41) comprises a succession of assembled elements directly attached to the subsurface of the lower base plate (12) of the front portion (11), the succession of assembled elements defines an distribution chamber communicating with a spray element (51), and a holder (55) is attached to the subsurface of the lower base plate (12) for supporting a container supporting coffee, and an end of the first flexible hydraulic connector (47), remote from the individual heating unit (46), communicates with the distribution chamber for supplying heated water to the injection group (41) for preparing coffee.

2. The individual coffee preparation unit according to claim 1, wherein each one of the injection groups (40, 41) has a second flexible hydraulic connector (65) which connects a hydropneumatic storage (64) with the distribution chamber (63) of the succession of assembled elements, and each the succession of assembled elements terminates with the spray element (51) to facilitate discharge of the heated water from the injection group (40, 41).

3. The individual coffee preparation unit according to claim 2, wherein the succession of assembled elements comprises, in succession, of a crosspiece (70), an injection piece (60), and the spray element (51), the crosspiece (70) is attached to the lower plate (12) of the front portion (11) by a screw connection (71) and the injection piece (60) and the spray element (51) are both connected to the crosspiece (70) by a screw (61).

4. The individual coffee preparation unit according to claim 3, wherein a lower central portion of the crosspiece (70) has a threaded portion (72) which engages with the screw (61) attaching the spray element (51) to the injection element (60), a plurality of connections (67, 68), each connected with one of the first and second flexible hydraulic connectors (47, 48), extend through the crosspiece (70), and a plurality of longitudinal channels (62), which each communicate with the distribution chamber (63), extend at least partially through the injection element (60) to supply heated water through the injection element (60) to the spray element (51).

5. The individual coffee preparation unit according to claim 3, wherein a first central conduit (73) extends through the crosspiece (70) for attaching the crosspiece (70) to the lower plate (12), a second conduit (74) interconnects the first flexible hydraulic connector (47) with the distribution chamber (63) for supplying heated water thereto, and a third conduit (75) interconnects the second flexible hydraulic connector (65) with the distribution chamber (63) which is connected to the hydropneumatic storage (64).

6. The individual coffee preparation unit according to claim 1, wherein the succession of assembled elements which form each one of the injection groups (40, 41) are all made from plastic.

7. The individual coffee preparation unit according to claim 1, wherein each individual heating unit (46) is an instant heat unit.

8. The individual coffee preparation unit according to claim 2, wherein an electric resistor is affixed to the lower surface (12) of the front portion (11), in a region where the injection group (40, 41) is attached, for maintaining the injection group (40, 41) at a stable coffee brewing temperature.

9. The individual coffee preparation unit according to claim 3, wherein the crosspiece (70) has a screw connection (71), attached to the lower surface (12) of the front portion (11), and a threaded portion (72) engages with the screw (61) to attached the injection element (60) and the spray element (51) to the crosspiece (70).

10. The individual coffee preparation unit according to claim 9, wherein the threaded portion (72) is a centrally located and is an extension of the crosspiece (70).

11. The individual coffee preparation unit according to claim 2, wherein first and second connectors (67, 68) extend through the lower plate (12) and communicate with distribution channel (63), and the first connector (67) is connected to the first flexible hydraulic connector (47) and the second connector (68) is connected to the second flexible hydraulic connector (65).

12. The individual coffee preparation unit according to claim 1, wherein an electric resistor is affixed to the lower surface (12) of the front portion (11), in a region where the injection group (40, 41) is attached, for maintaining the injection group (40, 41) at a stable coffee brewing temperature.

13. The individual coffee preparation unit according to claim 1, wherein said individual coffee preparation unit has an upper plate provided for heating coffee cups.

14. The individual coffee preparation unit according to claim 1, wherein all of said individual heating units (46) are connected to be supplied with water in parallel with one another via a single injection pump (24).

15. The individual coffee preparation unit according to claim 1, wherein each individual heating unit (46) has at least one heating plunger (77), a regulating sensor (78) and a safety sensor (79), and each electrovalve (48) includes a discharge element (80) to evacuate water from the electrovalve (48).

16. The individual coffee preparation unit according to claim 1, wherein a microprocessor is connected to an injection pump (24) and to each of the electrovalves (48) for controlling flow of water through said individual coffee preparation unit.

17. The individual coffee preparation unit according to claim 1, wherein the individual coffee preparation unit has a supply valve (22) which is connected to a water softener (23), and the water softener (23) is connected to supply water to both a pump (24) and a central heating unit (20) for providing heater water for other purposes.

18. An individual coffee preparation unit for the preparation and distribution of coffee for an espresso coffeemaker, the individual coffee preparation unit comprising:

a body (8) having a lower support plate (9) for supporting at least one cup and a front portion (11) of the individual coffee preparation unit having a lower base plate (12), spaced from the lower support plate (9), supporting a plurality of coffee preparation units (2, 3, 4), each one of the plurality of coffee preparation units (2, 3, 4) having a coffee injection group (40, 41) connected to a supply of electrically heated water for receiving water and preparing coffee;

wherein each one of the injection groups (40, 41) is connected to an individual heating unit (46) via a first flexible hydraulic connector (47), an electrovalve (48) is provided in the flexible hydraulic connector (47) to control a flow of heated water therethrough, and each one of the injection groups (40, 41) comprises a succession of assembled elements directly attached to the subsurface of the lower base plate (12) of the front portion (11), the succession of assembled elements defines an distribution chamber communicating with a spray element (51), and a holder (55) is attached to the subsurface of the lower base plate (12) for supporting a container supporting coffee, and an end of the first flexible hydraulic connector (47), remote from the individual heating unit (46), communicates with the distribution chamber for supplying heated water to the injection group (41) for preparing coffee; and each the injection group (40, 41) has a second flexible hydraulic connector (65) which connects a hydropneumatic storage (64) with the distribution chamber of the succession of assembled elements.

19. The individual coffee preparation unit, according to claim 18, wherein the hydropneumatic storage (64) is a closed unit which is sealed and hydraulically connected to the distribution chamber of the injection group (40, 41) by the second flexible hydraulic connector (65).

20. An individual coffee preparation unit for the preparation and distribution of coffee for an espresso coffeemaker, the individual coffee preparation unit comprising:

a body (8) having a lower support plate (9) for supporting at least one cup and a front portion (11) of the individual coffee preparation unit having a lower base plate (12), spaced from the lower support plate (9), supporting a plurality of coffee preparation units (2, 3, 4), each one of the plurality of coffee preparation units (2, 3, 4) having a coffee injection group (40, 41) connected to a supply of electrically heated water for receiving water and preparing coffee;

wherein each one of the injection groups (40, 41) is connected to an individual heating unit (46) via a first flexible hydraulic connector (47), an electrovalve (48) is provided in the flexible hydraulic connector (47) to control a flow of heated water therethrough, and each one of the injection groups (40, 41) comprises a succession of assembled elements directly attached to the subsurface of the lower base plate (12) of the front portion (11), the succession of assembled elements defines an distribution chamber communicating with a spray element (51), and a holder (55) is attached to the subsurface of the lower base plate (12) for supporting a container supporting coffee, and an end of the first flexible hydraulic connector (47), remote from the individual heating unit (46), communicates with the distribution chamber for supplying heated water to the injection group (41) for preparing coffee; and each electrovalve (48) contacts the body (8) of the individual coffee preparation unit to facilitate dissipation of heat, generated by the electrovalve (48), to the body (8) during use.

* * * * *